Aug. 20, 1968 W. SCHOLZ 3,397,959
PROCESS AND APPARATUS FOR THE PRODUCTION OF AMMONIA
Filed Nov. 9, 1966
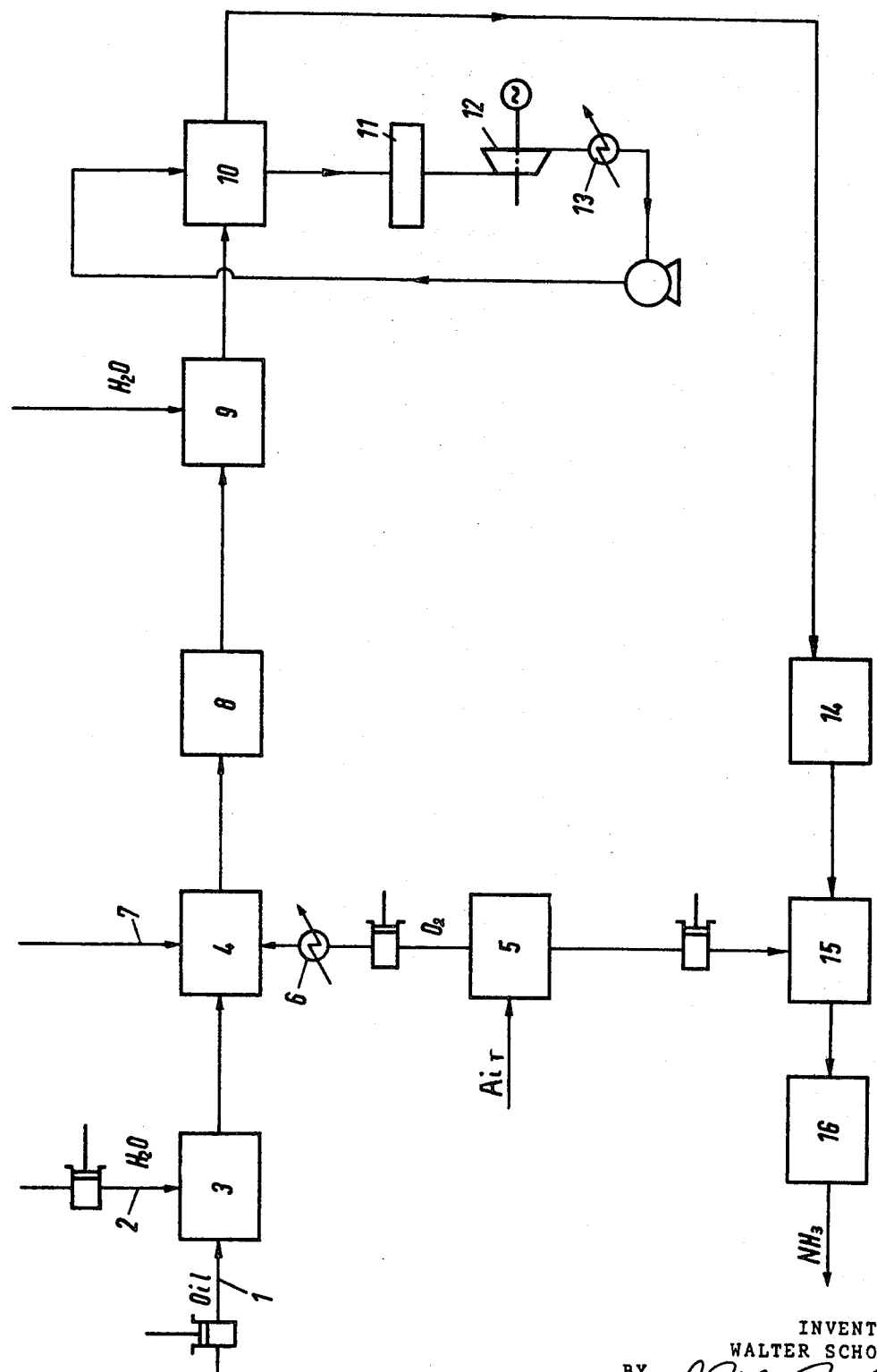
INVENTOR
WALTER SCHOLZ
BY
ATTORNEY

United States Patent Office 3,397,959
Patented Aug. 20, 1968

3,397,959
PROCESS AND APPARATUS FOR THE PRODUCTION OF AMMONIA
Walter Scholz, Wolfratshausen, Germany, assignor to Linde Aktiengesellschaft, Wiesbaden, Germany, and Lurgi Gesellschaft für Warmeund Chemotechnik m.b.H., Frankfurt am Main, Germany
Filed Nov. 9, 1966, Ser. No. 593,102
Claims priority, application Germany, Nov. 15, 1965, L 52,151
11 Claims. (Cl. 23—199)

ABSTRACT OF THE DISCLOSURE

In a process for the production of ammonia, comprising the steps of:
(A) producing raw hydrogen gas which contains carbon monoxide;
(B) converting the carbon monoxide in the gas to carbon dioxide and further hydrogen by the addition of steam;
(C) scrubbing the gas to remove the carbon dioxide;
(D) purifying the resultant hydrogen gas to remove carbon monoxide; and
(E) reacting the resultant purified gas in an ammonia synthesis, the improvement which comprises conducting step (A) at a pressure of 80–220 atmospheres; conducting steps (A), (B), (C) and (D), and preferably (E) also, at a pressure of 80–220 atmospheres, more preferably 140–170 atmospheres, and particularly wherein all steps are conducted at substantially the same pressure. By virtue of this process, an expensive compression step can be eliminated between step (A) and (E).

This invention relates to a novel process and apparatus for the synthesis of ammonia from hydrogen and nitrogen.

In known processes, hydrogen has been obtained in combination with carbon monoxide by, for example, gas-reforming with steam or by the partial combustion of hydrocarbons; then the resultant carbon monoxide has been converted by a water gas shift reaction to hydrogen and $CO_2$. The $CO_2$ has been removed by one of several known scrubbing steps, and the hydrogen is then brought to a high degree of purity in a final purification step which removes all of the carbon monoxide. A hydrogen-nitrogen mixture is then formed which is fed into the ammonia synthesis stage. The hydrogen-nitrogen ratio appropriate for the ammonia synthesis is usually adjusted during the production of the hydrogen in the first step by the addition of air, or by scrubbing the gas with liquid nitrogen in the final purification.

For the production of raw hydrogen gas, several processes are known or disclosed, for example, in "Industrial Chemicals," Third Edition, Faith, Keyes and Clark, Wiley & Sons, Inc., N.Y., 1965. In connection with the production of ammonia, the most common recent methods in the United States are the so-called gas-reforming processes wherein natural gas or other hydrocarbons, e.g., propane, are heated with steam to high temperatures of about 1400–1800° F. These gas-reforming processes have usually been conducted at a pressure of about 20–30 atmospheres absolute, but it has been recently suggested that as high as 42 atmospheres can be used.

With respect to the less frequently used partial oxidation process, it is based on the partial oxidation of hydrocarbon feed (natural gas through fuel oil) with oxygen. The reaction temperature is about 2600° F. and the pressure about 200–500 p.s.i.

Both of the precedingly described processes for providing hydrogen, as well as the old water gas method, employ a water gas shift reaction to convert carbon monoxide and steam into carbon dioxide and further hydrogen. The pressures employed in this reaction have ranged from atmospheric pressure to 30 atmospheres absolute.

Whereas the production of raw hydrogen has, in fact, entailed the utilization of high pressures, from ordinary standards, these same pressures are low as compared to the pressures employed in the ammonia synthesis step.

The ammonia synthesis has required a pressure of at least 140 atmospheres, and is usually conducted at a pressure of 250 to 350 atmospheres. It has, therefore, been necessary to compress the synthesis mixture of hydrogen-nitrogen to the pressure of 140 to 350 atmospheres. This has required both a large compressor plant and a large expenditure of energy. A further but less important problem with respect to cost resides in the fact that the raw hydrogen gas contains water vapor which exerts a partial pressure, but the partial pressure is too low to permit recovery of the heat of condensation as a source of external energy, i.e., insufficient to run a steam turbine.

One object of this invention, therefore, is to provide a process wherein it is unnecessary to compress raw or purified hydrogen to significantly higher pressures, and preferably without any further compression whatsoever.

Another object of this invention is to conduct the raw hydrogen production step and the conversion of the carbon monoxide into further hydrogen at such pressures that the heat of the reactions may be economically recovered as a source of energy.

Another object of the invention is a method and apparatus which does not require the compression of large quantities of gas from low to high pressures.

A general object of this invention is to provide a more economical method for the production of ammonia.

Upon further study of the specification and claims, other objects and advantages of the present invention will become apparent.

For the attainment of the above objects, it has been discovered that by conducting the step for the production of raw hydrogen at about 80 or better 90 to 220, preferably 140–170 atmospheres absolute, modification of the process can result in substantial economies. Furthermore, it has been discovered that by conducting the raw hydrogen step and all the ensuing steps through to and including ammonia synthesis at substantially the same pressure of 80–220, preferably 140–170 atmospheres absolute, the process economics are unexpectedly but significantly improved. By "substantially the same pressure" is meant that the pressure difference between the single units is due only to the pressure drop, this difference being throughout the whole plant in the range of about 10–20 atm.

Although the use of pressures above the conventional pressures of 20 to 30 atmospheres results in several unfavorable factors, e.g., a decrease in yields of CO and $H_2$, an increase in the residual content of hydrocarbons, and the propensity to soot formation, there are advantages which outweigh these factors when the pressure is maintained substantially the same throughout the process.

By combining, in accordance with the invention, the raw gas production, the conversion of CO, the $CO_2$-removal, and the final purification, as well as the ammonia synthesis in one process system conducted at the same pressure level, the considerable plant investment and energy costs which had to be expended for the synthesis gas compressor can be saved. Instead of compressing the gas ready for the synthesis, only the raw material necessary for the production thereof must be brought to the desired pressure. The difficulties inherent in this latter step are comparatively minor: If liquid hydrocarbons are employed as the charge for the production of raw hydrogen, the energy and equipment required for increasing the pressure thereon is relatively of very low cost. In the case of natural gas in particular, the natural well pressure thereof can be utilized.

The invention furthermore offers the advantage that the raw hydrogen gas, at the high pressure at which it is produced and then converted, has a substantially higher partial pressure of water vapor than in the known processes, with the ratio of gas to vapor being the same. Consequently, after the conversion, the water vapor condensation commences at a correspondingly higher temperature and, assuming an identical final condensation temperature, more vapor is condensed and thus more heat can be recovered. The final condensation temperature can, in this connection, be selected to be substantially higher than in the known processes, so that the vapor produced in heat exchange with the raw hydrogen gas is available at a higher temperature and a correspondingly higher pressure, and is thus considerably better suited for energy recovery in a turbine.

As mentioned above, the high pressure hydrogen-producing step produces a gas having a relatively high residual content of hydrocarbons. Additionally, the CO in the high pressure raw hydrogen gas must be converted at sufficiently high temperatures so that the vapor contained therein does not condense. The CO-content is, therefore, in this case, higher than usual after the conversion.

This higher content of CO represents another reason why it is unobvious to employ the process of this invention because when the synthesis is conducted below pressures of about 200 atmospheres, the catalysts suitable therefor are extremely sensitive to CO and $O_2$. Furthermore, an especially pure gas must be used since even the presence of "inert gases," such as methane and argon, result in a decrease in the partial pressure of the reactants, which has a significant detrimental effect on the synthesis step, resulting in lower yields and higher losses.

In order to conduct the synthesis under as advantageous conditions as possible, it is thus necessary to employ an especially effective final purification method. The conventional copper solution washing process under a high pressure has the disadvantage that only CO is absorbed, but not the other detrimental components. Similarly, methanation of CO by catalytic hydrogenation removes only CO and additionally increases the methane content and decreases the hydrogen content.

In a further preferred embodiment of the invention, this problem is solved by using a liquid nitrogen washing step, in a known manner. This type of final purification process exceeds that of the remaining methods, since this process completely removes all hydrocarbons, oxygen, argon, and CO. Therefore, this measure contributes essentially to the perfection of the inventive ammonia synthesis process which in its preferred embodiment operates from the raw gas production to the synthesis on the same pressure level.

It is particularly advantageous to conduct the liquid nitrogen scrubbing at a temperature close to the freezing point of the nitrogen, as is described in a copending application owned by the same assignee, Ser. No. 550,782, filed May 17, 1966, by Fritz Jakob. The shape of the liquid vapor equilibrium curve permits a simple $N_2$-CO separation; and large losses of hydrogen, on account of its high solubility in liquid nitrogen, are thereby avoided. Furthermore, since the process is conducted as far as possible from the critical range, there is no danger of encountering difficulties in the separation of the gas and liquid arising from the decrease in the density difference between the gas phase and the liquid phase.

The final $CO_2$-removal conducted before the nitrogen washing step is most suitably conducted also at a low temperature, namely, by scrubbing with an organic solvent, preferably methanol. Acetone also may be used.

If the charge for the hydrocarbon conversion step has a sulfur content, as is true in most instances for the partial combustion with oxygen, the hydrogen gas is contaminated with sulfur compounds and in some cases also with heavier hydrocarbons and resiniferous agents. In this case, it is recommended to operate in at least two stages, namely, one sulfur washing stage charged with a small amount of solvent (also, if desired, a $CO_2$ main washing step with a large amount of solvent which is regenerated only by expansion) and, finally, a $CO_2$ final washing stage with a completely regenerated solvent. $CO_2$ and sulfur compounds are thus removed together during the course of a single washing process, and can be discharged separately in concentrated form. The combination of the two low temperature processes, the cold scrubbing step with an organic solvent, and the nitrogen scrubbing step, has proven to be very advantageous, in this connection.

According to another embodiment of the invention, the sulfur compounds are removed before the step of converting CO to $CO_2$ and $H_2$, this removal being done in a selective manner, particularly with the aid of an organic solvent, such as xylene or methanol. In such a case, no sulfur-resistant catalysts need be used during the process; furthermore, a small amount of solvent is sufficient, since the quantity of the gas is smaller before the conversion step than thereafter. In this case, it is particularly simple to obtain a fraction rich in sulfur compounds which can be processed in a conventional manner to yield sulfur or sulfuric acid. In the subsequent $CO_2$ cold scrubbing step, the sulfur washing stage can be omitted, and the regeneration can be simplified.

The starting material for the ammonia production according to the invention can be gases stemming from processes, such as the partial combustion with oxygen or oxygen-enriched air, or the thermal or catalytic reforming with steam, and also, for example, from waste gases of a high pressure hydrogenation plant, refinery waste gases, or hydrogen-containing residual gases of other processes conducted at high pressures.

The ammonia synthesis can be conducted at the pressure level provided by the invention. It is conceivable, though, that in future ammonia synthesis systems, a higher ammonia yield will justify a further increase in the pressure of the gas ready for the synthesis. However, even if the compression of the synthesis gas to the synthesis pressure of about 220–300 atmospheres or higher should prove favorable, the expenditure for this measure is still considerably smaller than in the previously known processes.

With respect to other details of this process of producing ammonia, the prior art is bountiful, reference being made, for example, to Ullmans Encyklopädie der technischen Chemie, 3.Auflage, published by Urban & Schwarzenberg, München u. Berlin, vol. 3 (1953) p. 54 ff.

The attached drawing is a schematic flowsheet of the preferred embodiment of the invention. For reasons of clarity, only the most essential steps of the process are incorporated in the block diagram. It is to be appreciated that this preferred embodiment is not intended to be limitative of the claims in the light of the entire description of the invention.

The oil and demineralized water serving as the starting material are fed through conduits 1 and 2, respectively, to the preheating zone 3; these components, in the form of oil-vapor mixture, arrive at a temperature of 400° C. and at a pressure of 166 atmospheres gauge in the reactor 4. When entering this reactor, the components are combined with oxygen stemming from an air separation system 5, and preheated at 6 to 150° C.

Thereatfer, the mixture is converted into a gas, by adding heat of a burner (not shown), this conversion step taking place at a high temperature; the thus-obtained gas is comprised predominantly of hydrogen and CO. This gas arrives, at a temperature of about 1430° C., in the lower portion of the reactor, where it is quenched with water introduced through conduit 7. The gases leaving the reactor entrain soot, which soot is washed out with water in column 8. The soot-free gaseous mixture now has a pressure of 157 atmospheres gauge and a temperature of 305° C. It is heated countercurrently to the gas leaving the first conversion stage (not shown) and conducted, after the addition of water vapor, through a two-stage converter 9, at a temperature of 350° C., and a pressure of 156 atmospheres gauge, the larger portion of the CO being converted catalytically with the aid of water vapor to hydrogen and carbon dioxide.

The converted gas is fed, at 415° C. and 155 atmospheres gauge, to a cooling stage 10 and is cooled therein by direct heat exchange with water, to a temperature of 42° C. In this process, the water absorbs the reaction heat liberated during the conversion and leaves the cooler at a temperature of 285° C. and a pressure of 155 atmospheres gauge. This water is gradually cooled down in a series of heat exchangers and is finally returned to the cooling stage 10. In the first one of these heat exchangers, a vapor having a temperature of 217° C. and a pressure of 22 atmospheres gauge is produced, subsequently superheated at 11, and used to drive a turbine and generator 12 for obtaining electrical energy; at 13, the vapor is condensed and finally recycled to the heat exchangers for cooling the water heated in direct heat exchange with the conversion gas.

The cooled conversion gas is freed from $CO_2$ and $H_2S$ in a cold methanol scrubbing stage 14, as described in a copending application of a co-assignee, and subsequently scrubbed, at 15, with liquid nitrogen from the air separation plant 5 (as described in U.S. application Ser. No. 550,782, filed May 17, 1966), and the hydrogen-nitrogen proportion appropriate for the synthesis is simultaneously adjusted. The hydrogen-nitrogen mixture is finally introduced into an ammonia synthesis plant 16 operating in accordance with a known process, without being subjected to any further compression. The known process is described in Ullmans Encylopädie der technischen Chemie Vol. 3 (1953), p. 574 ff.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

In the following claims, as well as in the specification, the "atmospheres" of pressure are absolute atmospheres unless indicated otherwise.

What is claimed is:

1. In a process for the production of ammonia, comprising the steps of:
   (A) producing raw hydrogen gas which contains carbon monoxide;
   (B) converting the carbon monoxide in the gas to carbon dioxide and further hydrogen by the addition of steam;
   (C) scrubbing the gas to remove the carbon dioxide;
   (D) purifying the resultant hydrogen gas to remove carbon monoxide; and
   (E) reacting the resultant purified gas in an ammonia synthesis,
the improvement which comprises conducting steps (A), (B), (C) and (D) at a pressure of 80 to 220 atmospheres.

2. In a process for the production of ammonia, comprising the steps of:
   (A) producing raw hydrogen gas which contains carbon monoxide;
   (B) converting the carbon monoxide in the gas to carbon dioxide and further hydrogen by the addition of steam;
   (C) scrubbing the gas to remove the carbon dioxide;
   (D) purifying the resultant hydrogen gas to remove carbon monoxide; and
   (E) reacting the resultant purified gas in an ammonia synthesis,
the improvement which comprises conducting step (A) at a pressure of 90 to 220 atmospheres.

3. The process according to claim 1 wherein step (E) is conducted at substantially the same pressure as steps (A), (B), (C) and (D).

4. The process according to claim 1 wherein the pressure of step (A) is 140-170 atmospheres.

5. The process according to claim 2 wherein the pressure of step (A) is 140-170 atmospheres.

6. The process according to claim 3 in which the pressure in steps (A), (B), (C), (D) and (E) is substantially the same and is in the range of 140 to 170 atmospheres.

7. The process according to claim 1 in which the final purification step (D) includes a scrubbing of the gas with liquid nitrogen.

8. The process according to claim 1 wherein sulfur compounds and heavier hydrocarbons are removed by scrubbing with an organic solvent selective therefor just prior to step (D).

9. The process according to claim 1 in which any sulfur compounds and hydrocarbons are removed by scrubbing before the conversion step (B).

10. The process according to claim 1 in which the heat liberated in step (B) is taken up by water, and the heat is thus recovered as high pressure steam.

11. An apparatus for the production of ammonia comprising in combination:
   a reactor for partial combustion of hydrocarbons,
   a converter to convert CO to $CO_2$,
   a scrubber for removing $CO_2$ and recovering heat,
   a final purifier and ammonia synthesis chamber, each of said elements being connected in series to receive the gas from the previous stage without compression,
   and means to feed the material into the reactor at the pressure of the system,
and wherein a gas compressor is not interposed between the serially connected elements.

References Cited
UNITED STATES PATENTS

| | | | |
|---|---|---|---|
| 1,875,926 | 9/1932 | Hughes | 23—199 |
| 2,806,003 | 9/1957 | Housset et al. | 23—199 |
| 2,865,864 | 12/1958 | Eastman et al. | 23—199 X |

OSCAR R. VERTIZ, *Primary Examiner.*

H. S. MILLER, *Assistant Examiner.*